H. A. LACERDA.
STAY BOLT FOR BOILERS.
APPLICATION FILED OCT. 25, 1917.
1,275,944.
Patented Aug. 13, 1918.
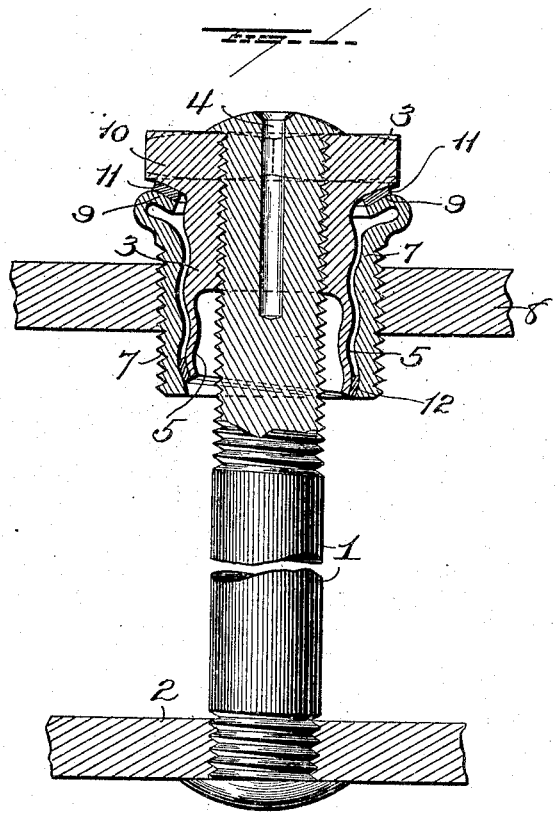
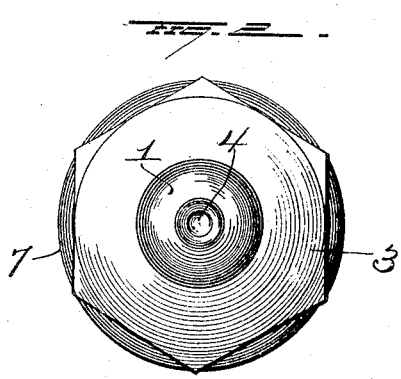
WITNESSES
INVENTOR
H. A. Lacerda
By Seymour & Bright
Attorneys

UNITED STATES PATENT OFFICE.

HARRY ANTHONY LACERDA, OF SCHENECTADY, NEW YORK, ASSIGNOR TO FLANNERY BOLT COMPANY, OF SCHENECTADY, NEW YORK.

STAY-BOLT FOR BOILERS.

1,275,944.   Specification of Letters Patent.   Patented Aug. 13, 1918.

Application filed October 25, 1917. Serial No. 198,459.

*To all whom it may concern:*

Be it known that I, HARRY ANTHONY LACERDA, a citizen of the United States, and a resident of Schenectady, in the county of Schenectady and State of New York, have invented certain new and useful Improvements in Stay-Bolts for Boilers; and I do hereby declare the following to be a full, clear, and exact description of the invention, such as will enable others skilled in the art to which it appertains to make and use the same.

This invention relates to an improvement in stay bolts for boilers, the object being to provide a connection between the outer sheet of the boiler and the bolt, that will permit of the necessary contraction and expansion of the bolt without straining the boiler sheets, and it consists in the parts and combinations of parts, and in the details of construction as will be more fully explained and pointed out in the claims.

In the accompanying drawings, Figure 1 is a view in section of my improvement, and Fig. 2 is a plan view of the same.

1 represents the stay bolt secured at one end to the inner sheet 2 of a boiler, and at its outer end to a nut 3. The bolt is preferably threaded at its two ends to engage respectively a threaded opening in the inner sheet and the internal threads in the nut 3, and is provided at its outer end with a tell tale bore 4, which extends inwardly to a point past the inner edge of the body of the nut so that in the event of a fracture of the bolt at the base of the nut the steam can escape through the tell tale and indicate the fracture. The outer end of the bolt preferably projects beyond the nut and is upset as shown to form a head which bears against the outer face of the nut.

The outer end of the head of the nut is made angular to permit it to be engaged by a wrench, and it is provided at the inner end of its body with an integral skirt or sleeve 5, the internal diameter of which is greater than the diameter of the bolt so as to be entirely clear of the latter.

The outer surface of the nut and its integral sleeve are provided with a coarse spiral grove or thread which engages a similarly grooved surface in the tubular plug 7. This plug 7 is externally threaded to engage a threaded hole in the outer sheet 8 of the boiler, and its upper edge is thinned or reduced in thickness and bent outwardly and then inwardly and downwardly to form an inclined resilient seat 9 for the copper gasket 11 on which the head 10 of the nut 3 rests, and which forms a steam tight connection between the plug 7 and the head of the nut. A similar gasket 12 is seated in the plug near the inner end of the latter and forms a steam tight seat for the inner free end of the sleeve 5 of the nut.

As before explained the rib and groove in the outer face of the body of the nut 3, and its sleeve 5, and the rib and groove in the inner face of the plug, are helical so as to operate as screw threads, and are comparatively large and curved, the rib on the nut and its sleeve being smaller than its companion grooove in the plug so as to permit of a limited longitudinal movement of the nut and its sleeve within the plug.

These spiral grooves and ribs serve as threads to draw the nut into the plug so as to firmly force the head of the nut and the lower free end of the sleeve into close contact with the soft metal gaskets 11 and 12, and this close contact is maintained by the resiliency of the seat on which the gasket 11 rests. The resilience or spring action of the seat for the gasket and nut, operates to draw the threads on the nut and sleeve in contact with the internal threads on the plug, and also compensates for expansion stresses on the outer sheet, while the size and shape of the threads permit of slight movements of the parts under stress.

Having fully described my invention what I claim as new and desire to secure by Letters Patent, is:—

1. A stay bolt for boilers comprising a bolt, a nut secured to the outer end of the bolt, and a tubular plug, the nut and plug having intermeshing coarse threads which permit of a limited movement of the nut and plug relative to each other.

2. A stay bolt for boilers comprising a bolt, a nut secured to the outer end of the bolt and helically grooved on its outer face and a tubular plug provided on its inner face with a helical rib which coacts with the groove in the nut, and also provided at its outer end with a resilient seat for the head of the nut.

3. A stay bolt for boilers comprising a bolt, a nut secured to the bolt and provided with an inwardly projecting integral sleeve, the outer surface of the nut and its sleeve being helically grooved, and a tubular plug having a rib intermeshing with the groove in the nut and sleeve, the coöperating ribs and grooves making a loose fit so as to permit of a limited longitudinal movement of the nut and plug relative to each other.

4. A stay bolt for boilers comprising a bolt, a nut secured to the outer end of the bolt, a tubular plug having an inwardly bent yielding seat, the nut and plug having intermeshing coarse ribs and grooves which permit of a slight longitudinal movement of the nut and plug relative to each other, and a soft metal gasket between the nut and the resilient seat on the plug.

5. A stay bolt for boilers comprising a bolt, a nut secured to the outer end of the bolt, a tubular plug having an inwardly bent yielding seat, the nut and plug having intermeshing coarse ribs and groooves which permit of a slight longitudinal movement of the nut and plug relative to each other, a soft metal gasket between the nut and the resilient seat on the plug, and a soft metal gasket between the lower end of the nut and the plug.

6. A stay bolt for boilers comprising a bolt, a nut secured to the outer end of the bolt and provided with an inwardly projecting integral sleeve, the outer surface of the nut and its sleeve being helically grooved, a tubular plug having a seat at its outer end and helically grooved internally to intermesh with the rib and groove on the nut and sleeve, the ribs and grooves on said parts being constructed to permit of a slight longitudinal movement of the nut and plug relatively to each other, a soft metal gasket between the head of the nut and the seat at the outer end of the plug, and a similar gasket between the inner end of the sleeve and the plug.

In testimony whereof I have signed this specification in the presence of two subscribing witnesses.

HARRY ANTHONY LACERDA.

Witnesses:
 HERMAN COHEN,
 MARY GREENBLATH.

Copies of this patent may be obtained for five cents each, by addressing the "Commissioner of Patents, Washington, D. C."